United States Patent [19]
Peifer

[11] Patent Number: 5,551,913
[45] Date of Patent: Sep. 3, 1996

[54] COMBINED INSTRUMENT MOUNTING AND AIR CONDUCTING HOUSING

[75] Inventor: Gary S. Peifer, Waynesville, Ill.

[73] Assignee: Caterpillar Inc., Peoria, Ill.

[21] Appl. No.: 367,548

[22] Filed: Jan. 3, 1995

[51] Int. Cl.⁶ ..................................... B60H 1/26
[52] U.S. Cl. ........................... 454/121; 454/85
[58] Field of Search ............................ 454/85, 121, 127, 454/143, 137, 134, 158

[56] References Cited

U.S. PATENT DOCUMENTS

| | | | |
|---|---|---|---|
| 4,223,754 | 9/1980 | Mizuno et al. | 454/127 X |
| 4,365,541 | 12/1982 | Marques et al. | |
| 4,721,031 | 1/1988 | Nakata et al. | 454/121 |
| 5,113,748 | 5/1992 | Shibuya | 454/121 X |
| 5,308,279 | 5/1994 | Grinberg | 454/139 |

Primary Examiner—Harold Joyce
Attorney, Agent, or Firm—Loyal O. Watts; Dennis C. Skarvan

[57] ABSTRACT

The combined instrument mounting and air conducting housing provides both the instrument mounting and air conduction and distribution in a single compact housing. The housing includes an upper central instrument mounting portion. The housing further includes a generally Y-shaped portion for conduction of air through the housing. The Y-shaped portion includes a lower portion defining an air inlet chamber and an upper portion defining a pair of laterally spaced air distribution channels. The laterally spaced distribution channels are individually disposed at respective laterally outer edges of the upper central instrument mounting portion. The upper ends of the air distribution channels are joined in fluid communication by a connection air channel defined by the upper portion of the housing. Suitable discharge openings and adjustable air discharge vents are provided to direct air in the appropriate directions within the cab.

11 Claims, 5 Drawing Sheets

Fig_2_

Fig_3_

Fig_6_
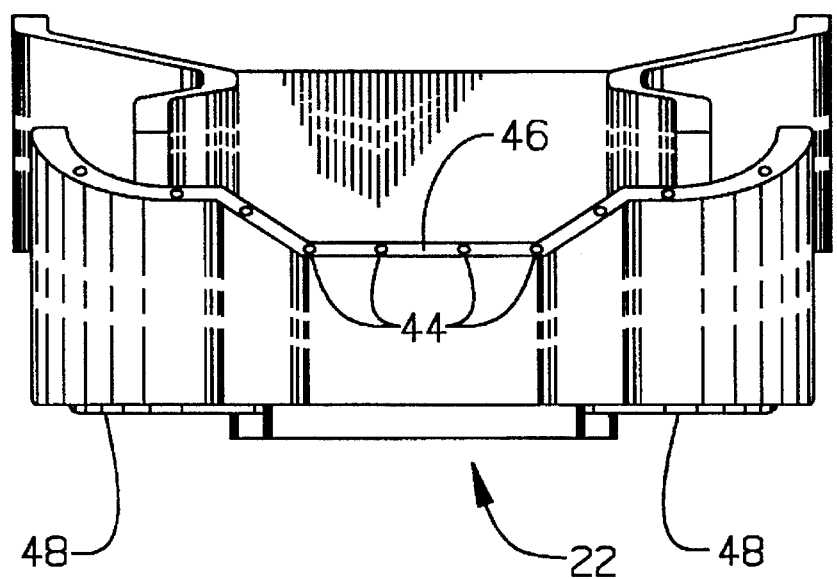
Fig_7_
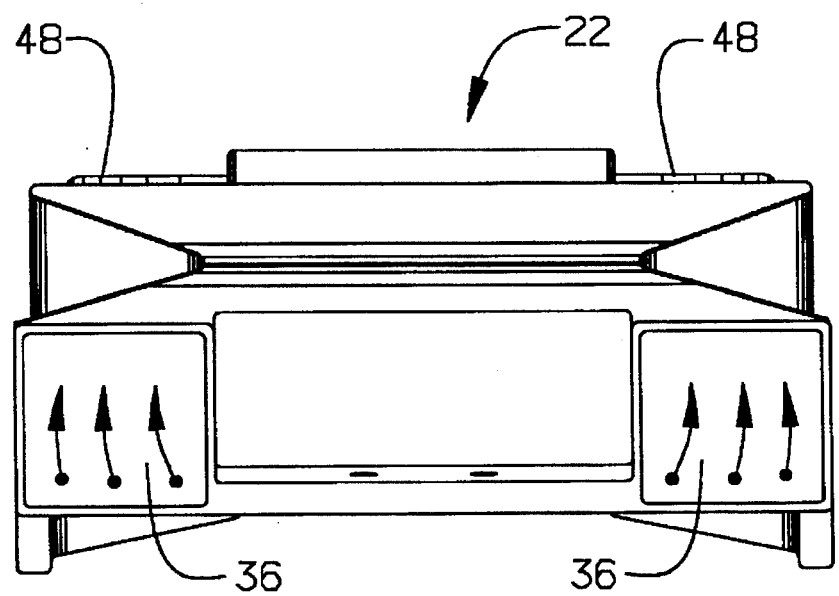

COMBINED INSTRUMENT MOUNTING AND AIR CONDUCTING HOUSING

TECHNICAL FIELD

This invention relates generally to instrument mounting and air distribution in heavy machinery and more particularly to a combined instrument mounting and air conducting housing.

BACKGROUND ART

In heavy equipment such as earthmoving equipment it is important to have the instruments conveniently mounted within the operators normal field of vision. It is desirable that conditioned air (heated or cooled) be delivered to the front area of an enclosure for the operator in an efficient and cost effective manner. The air distribution system should include availability of conditioned air to the front windows of the enclosure for defrosting purposes. It is also important that the air be available for direction toward their operator as well as laterally of the enclosure to enhance the comfort of the operator.

U.S. Pat. No. 5,308,279 issued on May 3, 1994 to Grinberg and is commonly assigned to the assignee of the present application. The air circulation and distribution system of the '279 patent requires two sets of ducts and two air vent housings thus requiring greater cost and additional labor. The air vents do not utilize an instrument mounting housing thus requiring specially designed housings also at additional cost.

U.S. Pat. No. 4,365,541 issued on Dec. 28, 1982 to Marques et al. and is commonly assigned to the assignee of the present application. The structure of the '541 patent requires a specially designed vent housing separate from any instrument housing thus involving greater cost and labor.

The present invention is directed to overcoming one or more of the problems set forth above.

DISCLOSURE OF THE INVENTION

The present invention relates to a combined instrument mounting and air conducting housing. The housing includes a first portion for mounting appropriate instruments and a second portion for defining a duct for directing air to appropriate locations for venting to the interior of an operator's enclosure or cab. The housing also includes a means for sealably separating the air duct from the first portion of the housing.

The present invention provides a relatively inexpensive structure to support the instruments and conduct air to the areas at the front of the cab to provide for window defrosting and operator comfort. The dual utilization of the housing reduces the cost and labor of providing the needed structure for the two functions.

BRIEF DESCRIPTION OF THE DRAWINGS

FIG. 6 is a top plan view of the housing of the present invention; and

FIG. 7 is a bottom view of the housing of the present invention.

BEST MODE FOR CARRYING OUT THE INVENTION

Figure 1:
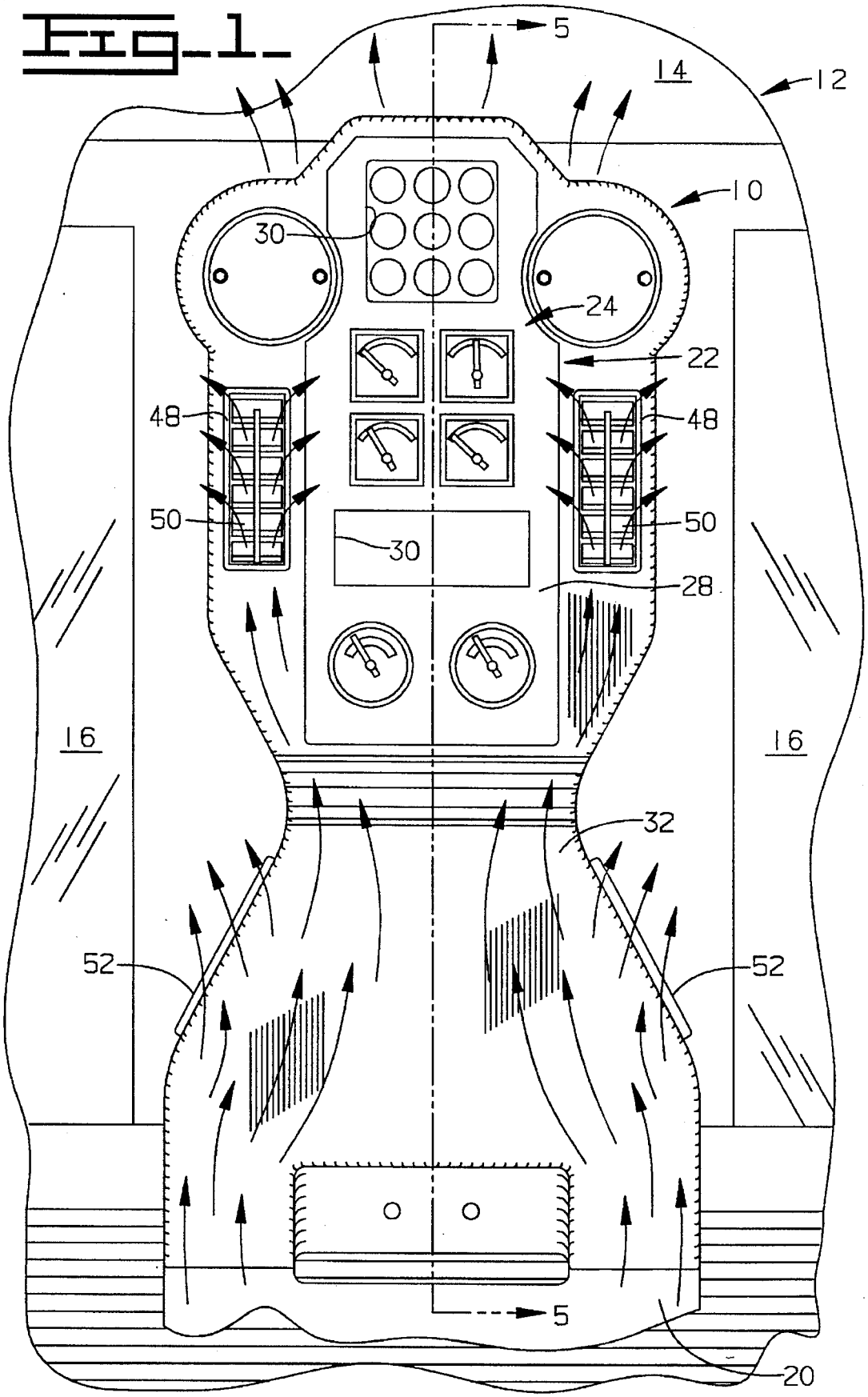
FIG. 1 is a fragmentary view of the interior of a portion of the front wall of an enclosure for an operator and a instrument mounting and air conducting housing of the present invention.
Figure 2:
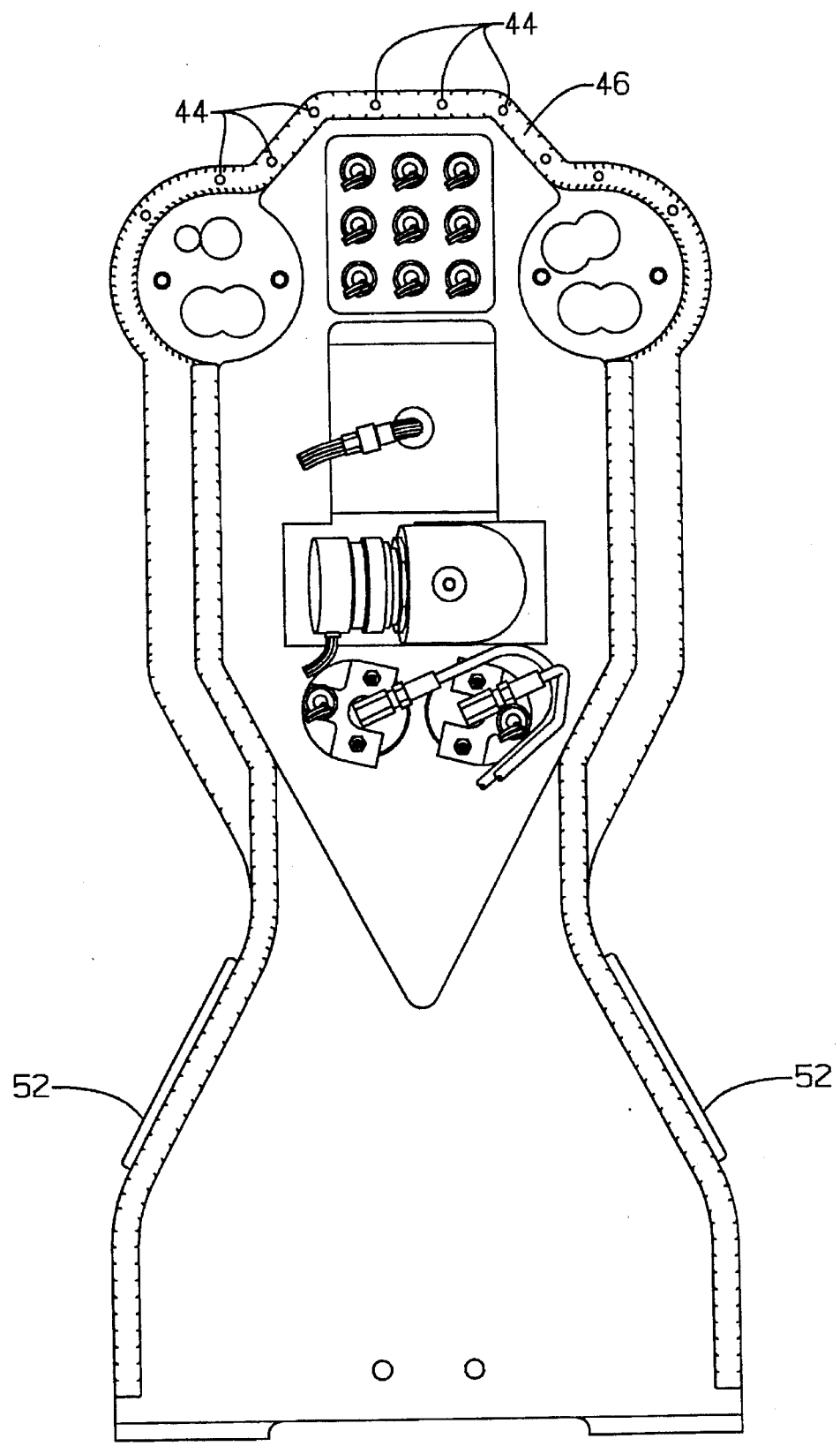
FIG. 2 is a rear elevational view of the housing of FIG. 1.

Referring now to the drawings and more particularly to FIGS. 1 and 2; an instrument mounting and air conducting housing 10 is provided for an enclosure or cab of a machine, such as motor grader or other earthmoving equipment. A portion of a cab 12 includes a large upper transparent window 14 and a pair of side-by-side lower transparent windows 16. A portion of an air duct 20 is connected to the lower end of the combined instrument mounting and air conducting housing.

The housing 10 includes an upper central portion 22 adapted to mount a plurality of appropriate instruments 24 in any suitable manner. A cover plate 28 with suitable openings 30 for visibility of the instruments is secured to the upper central portion of the housing. The housing 10 further includes a generally Y-shaped portion 32 for conduction of air through the housing.

Figure 3:
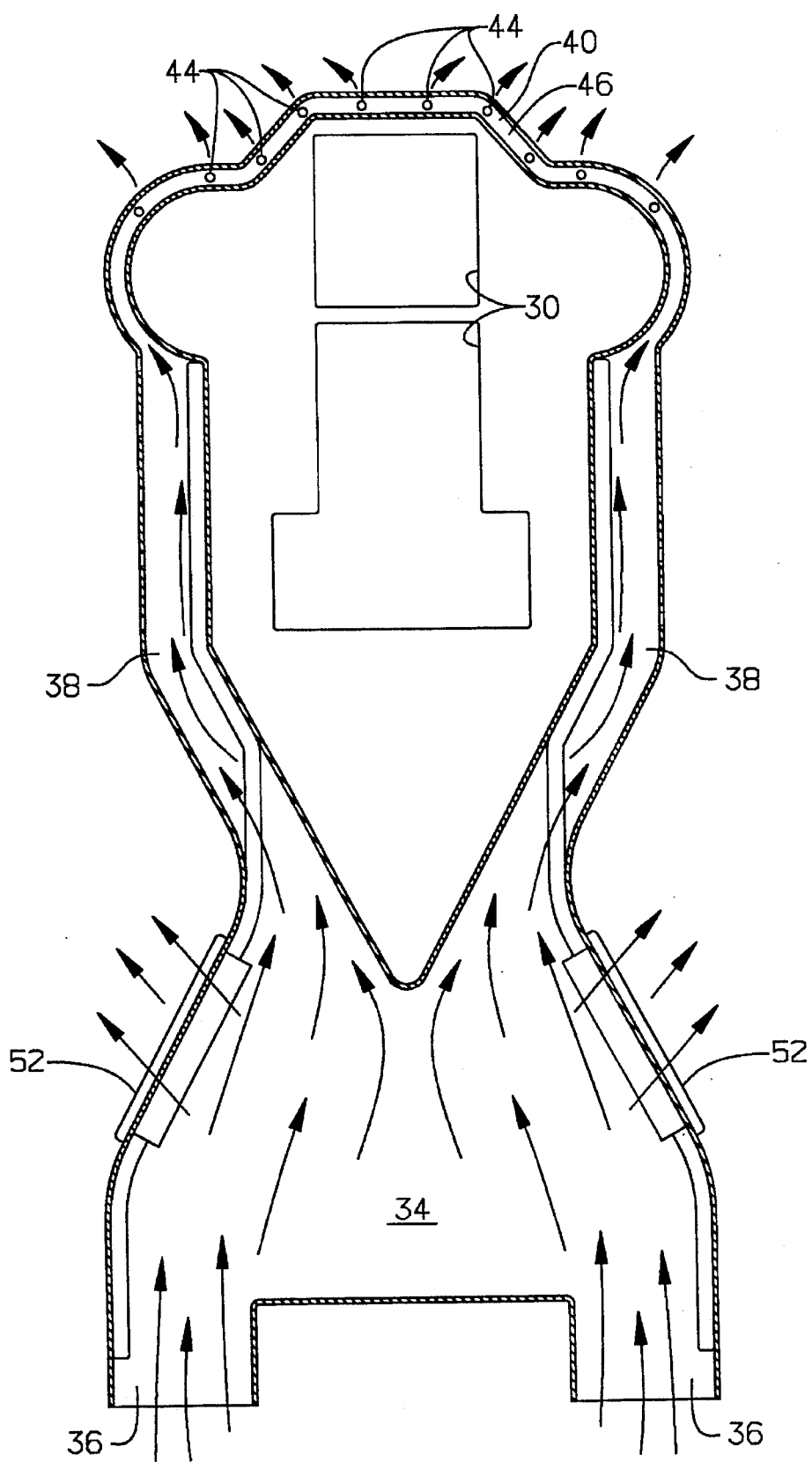
FIG. 3 is a cross-sectional view taken along the line 3—3 of FIG. 4.
Figure 4:
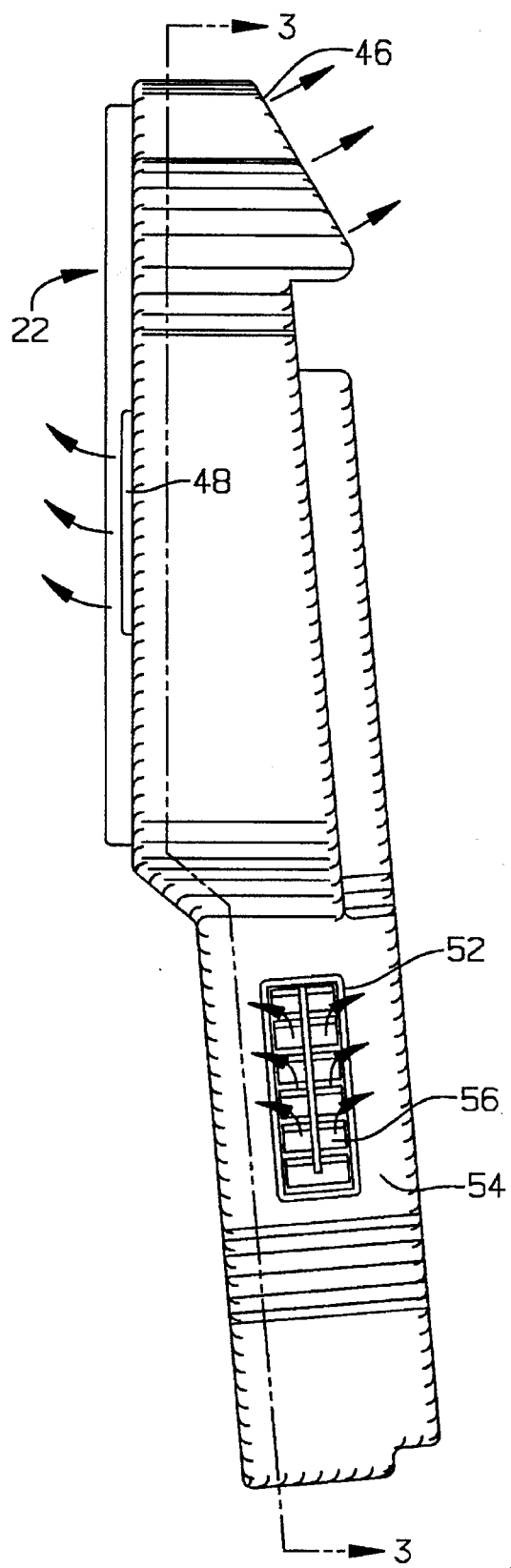
FIG. 4 is right side elevational view of the housing of the present invention.
Figure 5:
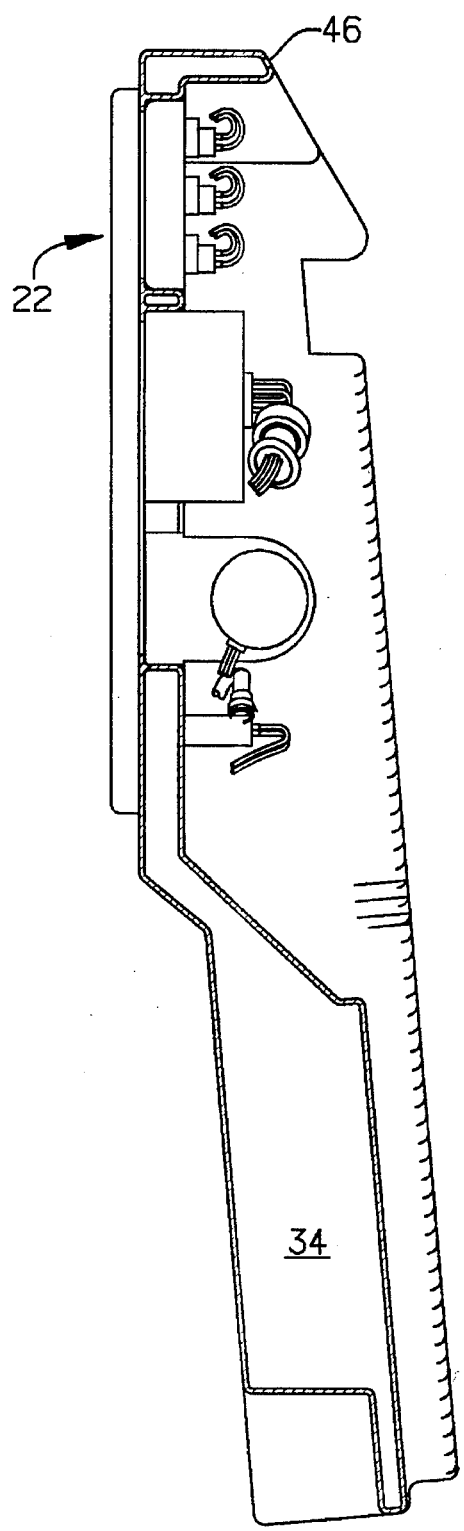
FIG. 5 is a cross-sectional view taken along the line 5—5 of FIG. 1.

As best seen in FIG. 3 the Y-shaped portion includes a lower portion defining an air inlet chamber 34 having a pair of air inlets 36 for reception of air. The housing also includes an upper portion defining a pair of laterally spaced air distribution channels 38 communication with the inlet chamber 34. The laterally spaced air distribution channels 38 are individually disposed at respective laterally outer edges of the upper central instrument mounting portion 22. The upper ends (as viewed in the drawing) of the air distribution channels 38 are joined in fluid communication by a connecting air channel 40 defined by the upper portion of the housing 10. It is recognized that the connecting air channel 40 could be divided by a thin wall (not shown) at a central location without adversely affecting the function of the channel 40.

Referring now to FIG. 1 the air supply conduit 20 connected to the lower end of the housing 10 supplies air to the air inlet chamber 34 through the air inlets 36. The housing 10 includes a plurality of air discharge openings 44 communicating with the connecting channel 40. The discharge openings 44 are located in an upper tapered rear wall 46 defining the back wall of the connecting air channel 40. Air discharged through the air discharge openings 44 is directed across the large upper window 14 for defogging thereof.

A pair of adjustable air discharge vents 48 are located in the front face of the housing 10 and individually communicate between a respective one of the laterally spaced air distribution channels and the interior of the cab. The discharge vents normally include adjustable louvers 50 to direct the air in the desired direction. Another pair of adjustable air discharge vents 52 are also individually mounted in a respective one of the outer side walls 54 of the lower portion of the Y-shaped portion 32 of the housing 10. The air vents 52 also include adjustable louvers 56 to direct the air in the desired direction, for example along the side windows 116, for defogging purposes.

INDUSTRIAL APPLICABILITY

In operation the instruments are mounted in appropriate openings in the upper central portion 22 of the housing 10 to provide good visibility of the instruments for the operator. As needed, air is directed through the air duct 20 to the air inlet chamber 34 and flows from there through the laterally spaced air distribution channels 38. Air from the inlet chamber 34 is available to the adjustable air vents 52 mounted on the outer sidewalls 54 of the housing 10. These vents may be regulated by the operator to a closed position or an open position to discharge air into the inclosure for the operator. The louvers may also be adjusted to direct the air in an appropriate direction, such as across the lower windows 16.

Air flowing through the laterally spaced air distribution channels 38 is available to the adjustable air discharge vents 48 located in the front face of the housing 10. The operator may regulate the vents 48 to either a closed or an open position to admit air to enclosure or cab and adjust the direction of air flow as desired for maximum operator comfort. Air flowing through the housing is also available to the air discharge openings 44 which direct air toward and upwardly along the large upper window 14 for defogging purposes.

Other aspects, objects, and advantages of this invention can be obtained from a study of the drawings, the disclosure, and the appended claims.

I claim:

1. A combined instrument mounting and air conducting housing, comprising:

a first portion of the housing for mounting appropriate instruments thereon;

a second portion of the housing for defining a duct for directing air through the housing to appropriate locations for venting to the interior of an operator enclosure when installed and operative;

means in the housing for sealably separating the air duct from the first portion of the housing;

wherein the housing includes a lower portion having an inlet chamber portion of the duct, an upper portion including the first portion for mounting the instruments and a distribution portion of the duct, and the housing includes a wall disposed substantially at the juncture of the upper and lower portions of the housing for dividing the distribution portion of the duct into a pair of distribution ducts individually extending on opposite sides of the first portion of the housing for mounting the instruments.

2. The combined instrument mounting and air conducting housing of claim 1 wherein the pair of distribution ducts are connected at and extend across the top of the housing.

3. The combined instrument mounting and air conducting housing of claim 2 wherein the wall for dividing is substantially V-shaped in lateral cross-section and defines the lower end of the first portion for mounting the instruments.

4. The combined instrument mounting and air conducting housing of claim 3 including discharge openings communicating from the distribution ducts at predetermined locations sufficient to discharge air to the interior surface of front windows of the operator's enclosure when installed and operating.

5. The combined instrument mounting and air conducting housing of claim 4 wherein the housing includes a front wall having a pair of operator comfort vents mounted therein for directing air toward the operator location within the operator enclosure.

6. The combined instrument mounting and air conducting housing of claim 5 wherein the comfort vents each communicate with a respective one of the pair of distribution ducts.

7. The combined instrument mounting and air conducting housing of claim 6 wherein the housing includes a pair of sidewalls partially defining the duct for directing and a pair of air vents mounted one in each of the sidewalls for directing air to the interior of the operator enclosure.

8. An instrument housing for use with construction equipment to mount instrument displays and deliver conditioned air to an operator, comprising:

a first central portion adapted for mounting a number of instrument displays thereon;

a second portion sealingly separated from said first central portion, said second portion surrounding said first central portion and being adapted for receiving and ducting air around said first central portion;

said second portion including an inlet duct disposed below said first central portion, a first outlet duct disposed at or above said first central portion and a pair of distribution ducts adapted for conducting the air between said inlet duct and said first outlet duct;

said pair of distribution ducts individually extending about opposite sides of said first central portion.

9. The instrument housing of claim 8, wherein said second portion is generally Y-shaped.

10. The instrument housing of claim 8, and further comprising second and third outlet ducts, wherein said first outlet duct is disposed above said first central portion and adapted for directing the air to a first window portion of the equipment for defogging, said second outlet duct is disposed at said first central portion and adapted for directing the air at an operator of the equipment, and said third outlet duct is disposed below said first central portion and adapted for directing air at a second window portion of the equipment for defogging.

11. A method for mounting instrument displays and delivering conditioned air in an instrument housing to an operator of construction equipment, the instrument housing including a first central portion adapted for mounting a number of instrument displays thereon and a second portion sealingly separated from said first central portion, said second portion adapted for receiving and ducting air through said instrument housing, the method comprising the steps of:

arranging said second portion about said first central portion wherein said second portion receives and ducts air around said first central portion;

said second portion including an inlet duct disposed below said first central portion, a first outlet duct disposed at or above said first central portion and a pair of distribution ducts adapted for conducting the air between said inlet duct and said first outlet duct; and arranging said pair of distribution ducts individually extending about opposite sides of said first central portion.

* * * * *